Fig. 1.

H. HOPKINS.
MOTOR DRIVE FOR CALCULATING MACHINES.
APPLICATION FILED FEB. 14, 1907.

1,025,698.

Patented May 7, 1912.

Witnesses
A. J. McCauley
G. R. Gedson

Inventor:
Hubert Hopkins
by Bakewell & Cornwall
Att'ys.

H. HOPKINS.
MOTOR DRIVE FOR CALCULATING MACHINES.
APPLICATION FILED FEB. 14, 1907.

1,025,698.

Patented May 7, 1912.

Witnesses
A. J. McCauley
G. R. Ladson

Inventor:
Hubert Hopkins
by Bakewell Cornwall
Att'ys.

UNITED STATES PATENT OFFICE.

HUBERT HOPKINS, OF ST. LOUIS, MISSOURI, ASSIGNOR TO THE MOON-HOPKINS BILLING MACHINE COMPANY, OF ST. LOUIS, MISSOURI, A CORPORATION OF MISSOURI.

MOTOR-DRIVE FOR CALCULATING-MACHINES.

1,025,698.  Specification of Letters Patent.  Patented May 7, 1912.

Application filed February 14, 1907. Serial No. 357,358.

*To all whom it may concern:*

Be it known that I, HUBERT HOPKINS, a citizen of the United States, residing at St. Louis, Missouri, have invented a certain new and useful Improvement in Motor-Drives for Calculating-Machines, of which the following is a full, clear, and exact description, such as will enable others skilled in the art to which it appertains to make and use the same, reference being had to the accompanying drawings, forming part of this specification, in which—

This invention relates to a new and useful improvement in motor drives for calculating machines, the particular calculating machine shown in the accompanying drawings being that illustrated in Belgian Letters Patent No. 202,081, dated August 21, 1907, and also in U. S. application filed by me April 9, 1906, and serially numbered 310,739. I do not wish to be understood, however, as stating that my improved motor drive is applicable only to this particular machine as the same is useful in connection with other types of calculating machines.

In the calculating machine shown in the accompanying drawings the operation of introducing examples into the machine is performed by depressing the proper keys in group A, which, through the bars 56, raise the stops 63, in a traveling carriage 57, after which, when the power shaft is operated, intermediate stop pins 93 are raised in front of projections 101 on the rack bars 100 and as the rack bars move forward, they are arrested in one of nine different positions by said stop pins 93. The totalizer or register wheels 119 are thrown into engagement with the racks, when the racks are in their forward position, after which the restoring bar 104 picks up the rocking levers 102, having slot and pin connections with the racks, and restores the racks to their normal position and by so doing introduces the example into the register. The rocking levers 102 constitute the operating mechanism for the racks and these levers 102 are moved by the power devices hereinafter described. Springs 103 move the levers 102 and their connected rack bars forward.

Figure 1:
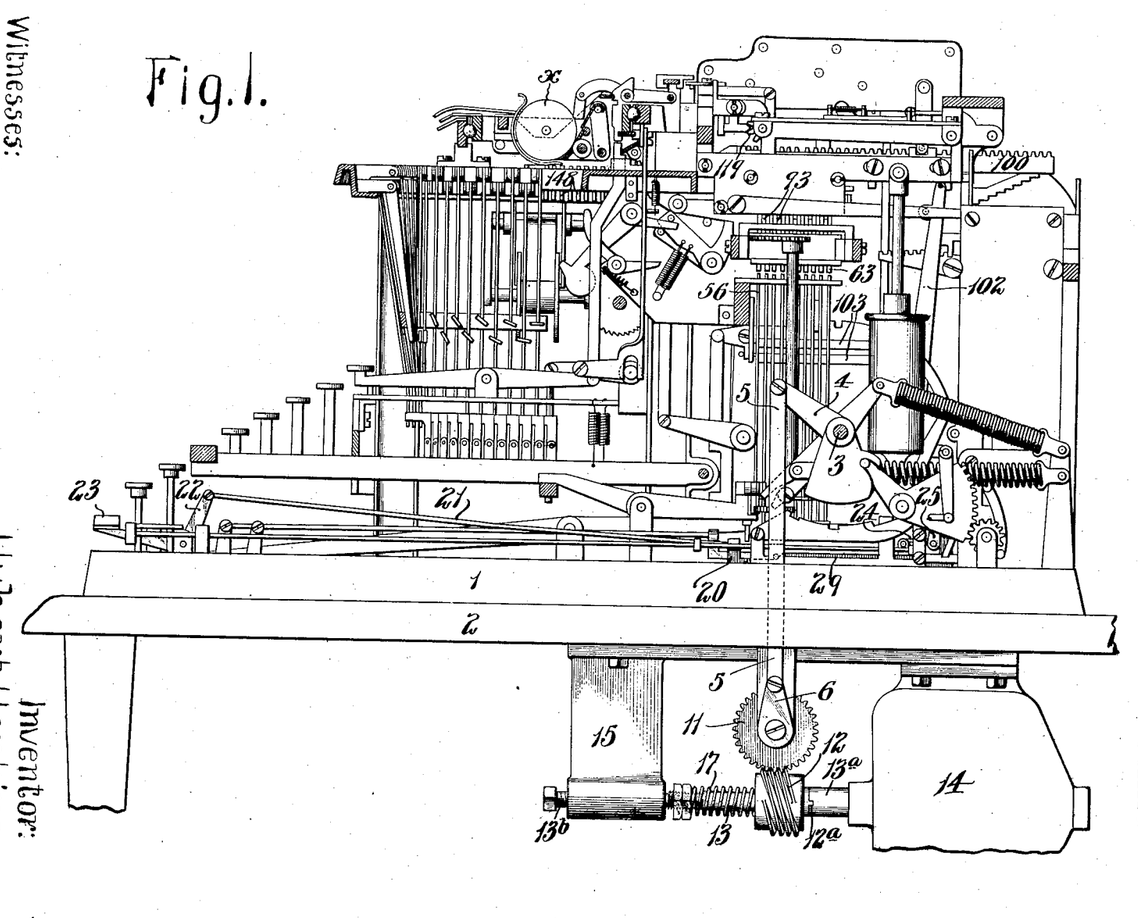
Figure 1 is a side elevational view of a calculating machine equipped with my improved motor drive.
Figure 2:
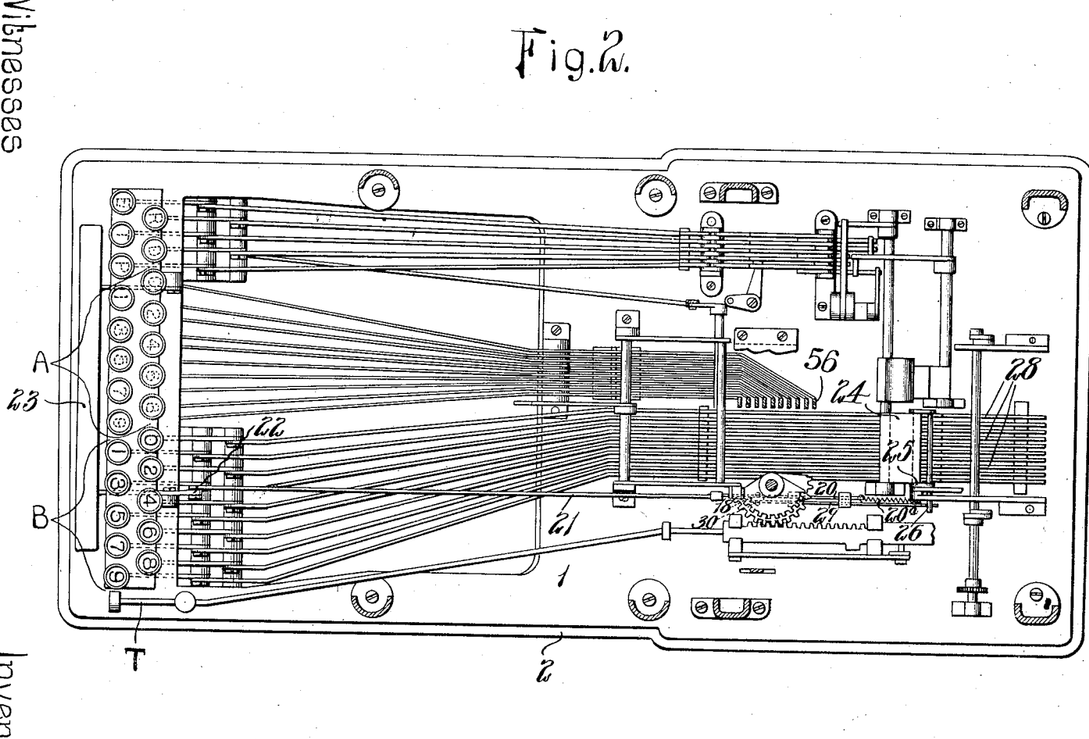
Fig. 2 is a plan view showing the key bar arrangement.

To obtain a total the key marked "T", see Fig. 2, is depressed which causes the register wheels 119 to engage with the racks before the racks start on their forward movement and consequently the wheels 119 if not standing at zero position will be reversely rotated until printing type, carried at the forward end of the racks, exhibit the total of the amount registered in the wheels 119. A product register represented by the wheels 268 also coöperates with the racks 100, and, if desired, instead of introducing an example into the register wheels 119, the "D" key, see Fig. 2, may be pressed and an example introduced directly into the wheels 268. If it is desired to register items directly into the wheels 268, said items are set up on the keys in group A in the usual way, the D key pressed down after an item has been set up, and the power shaft operated. The product or total indicated on the register wheels 268 is obtained by pressing the P key, and operating the power shaft of the machine, and in such total-taking operations the number registered in the wheels 268 is cleared from said wheels and registered in the wheels 119.

In the machine shown, the operation of multiplying is performed by setting up the multiplicand through the medium of the keys in group A and pressing the R key which results in setting up the example both in the register wheels 119 and in the multiplying device. The multiplicand if already set up in the wheels 119 may be transferred therefrom through the medium of the racks 100 by pressing the E key and operating said racks. The digits of the multiplier are separately set up by pressing the keys in group B. When a key in group B is depressed, the power shaft must be operated twice, except for the zero character, for the purpose of obtaining tens and units partial products which are introduced into the product register wheels 268, and there added together to form a complete product. When a complete product is obtained the P key may be pressed and the product recorded and at the same time registered in the register wheels 119. Suitable carrying mechanism is provided for the register wheels 119 and 268 and if desired, several groups of totalizer wheels 119 may be arranged to engage with the racks 100 at different times whereby separate totals or totals of different articles or things may be carried in the machine at the same time. The rack bars carry printing type 148 by which the items and the total thereof introduced into the adding register or totalizer may be recorded, and when a complete product is obtained said product may be recorded.

The paper on which the printed record is made coöperates with the platen X arranged in the carriage at the top of the machine, which carriage is movable across the machine. Typewriting mechanism is also used to print words and characters on the paper in the carriage in line with the type impressions derived from the type carried by the rack bars of the calculating machine.

I do not deem it necessary for purposes of this application to describe the details of construction and various operations of the several parts constituting the calculating machine forming the subject-matter of my application aforesaid, as the same form no part of this present invention.

My present invention consists in arranging a constantly running motor so that it will drive a clutch member, and in providing means whereby the driven member of the clutch, connected to the power shaft of the calculating machine, may be coupled and uncoupled from the driving clutch member to effect a single operation of the calculating machine in introducing an item into the register or securing a result by operating one of the result keys, such single operation being under the control of a special key designed particularly for that purpose.

My invention further consists in combining with the multiplier keys certain devices which, whenever a multiplier key is depressed, will, independently of the special motor drive key before referred to, cause the motor drive mechanism to impart two operations of the power shaft of the calculating machine, in order that the operations of multiplying may be performed.

In the drawings, 1 indicates the base casting of the calculating machine on which the side frames and other parts are mounted. This calculating machine as an entirety may be supported on a table or suitable stand indicated at 2.

3 is the power shaft of the calculating machine, which power shaft in operation is to be rocked through an angle of 70°.

4 is a rock arm arranged on the rock shaft, which arm is connected by a link 5 to a crank arm 6 arranged on a counter shaft 7. This counter shaft is mounted in suitable bracket bearings on the under-side of the table, and has pinned to it a collar 8, which collar is provided with teeth 8ª fitting in recesses in the end of a movable sleeve 9 slidingly mounted on the counter shaft 7. It is obvious that this sleeve portion 9 could be splined or feathered on the counter shaft instead of coöperating with the teeth 8ª. A spring 10 arranged between the parts 8 and 9 tends to force the movable part 9 longitudinally the shaft 7 so that the side-faced ratchet teeth on the end of sleeve 9 will engage corresponding ratchet teeth on the hub of the driving member 11 of the clutch. This driving member 11 is in the form of a worm wheel loosely mounted on the counter shaft 7. The inclination or spiral pitch of the teeth on the wheel 11 tends to hold the wheel against the supporting bracket and away from the part 9. A collar 11ª on the shaft is also used to hold the wheel 11 in place.

Figure 3:
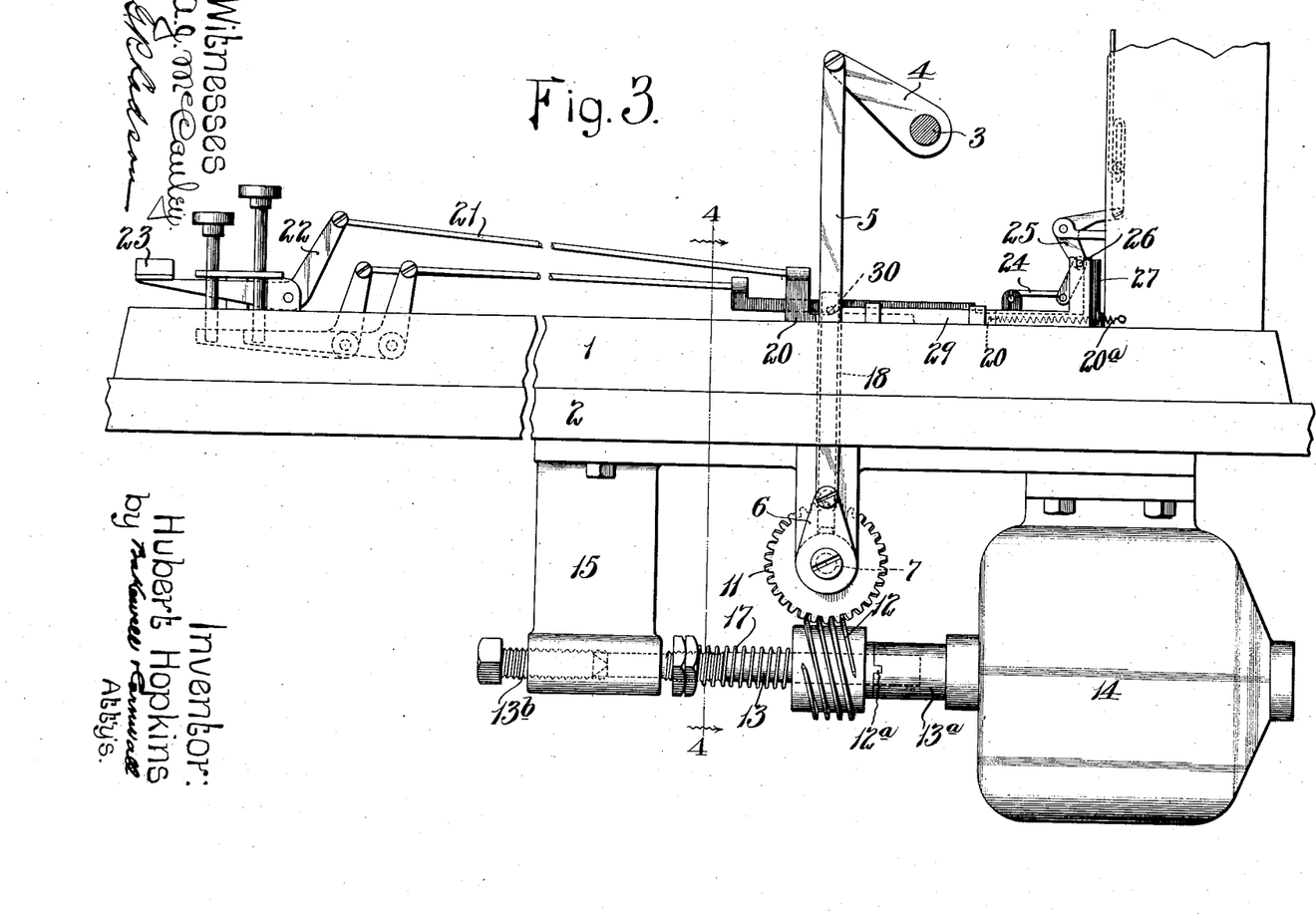
Fig. 3 is a fragmentary side elevation.

12 indicates a worm slidingly mounted on a section 13 of an armature shaft 13ª, which section is socketed in said armature shaft and is driven by the armature in motor 14. The outer end of the section 13 finds a bearing in bracket 15 depending from the under-side of the table. The armature shaft 13ª has recesses in its end, in which recesses the teeth 12ª of the worm 12 are normally seated, and a spring 17 tends to hold the teeth 12ª in their seats. The tension of spring 17 is made adjustable by suitable jam nuts, as shown in Fig. 3. An adjustable plug 13ᵇ mounted in the bracket 15 is provided with a thrust block against which the outer end of section 13 operates. In the event that the clutch members 8 and 9 are engaged and power is imparted to drive the calculating machine, it might happen that some of the parts of the mechanism of the calculating machine would not operate properly or be disarranged, in which instance it would be desirable to throw out the motor drive.

The purpose of the spring 17 is to permit this. The tension of spring 17 is such, under ordinary circumstances, that the teeth 12$^a$ are held in their seats and the calculating machine will be driven. When, however, the load is increased to such an extent that the spring 17 will yield, then the teeth of worm 12, due to their pitch, will cause the teeth 12$^a$ to be drawn out of the recesses in the end of the armature shaft and compress the spring 17, thus automatically disconnecting the motor from the calculating machine. When the worm 12 is disengaged from the armature shaft the section 13 may cease rotating. But this is immaterial as the worm 12 is loosely mounted thereon, and it would make no difference even if the section 13 continued to rotate while the worm remains stationary. The spring 17, however, exerts sufficient tension to hold the section 13 stationary. When the calculating machine is unlocked and ready to continue its operation, the spring 17 will force the teeth 12$^a$ into their seats and the worm 12 will be rotated.

Figure 9:
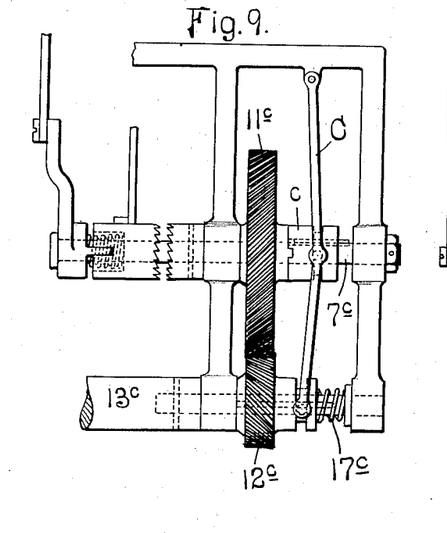
Figs. 9, 10 and 11 illustrate modified forms of the means for disconnecting the motor drive from the calculating machine when the driven mechanism is overloaded.
Figure 10:
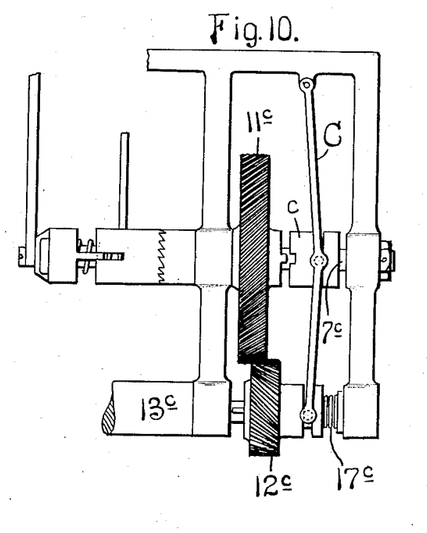

From the above it will be observed that the part 13$^a$ referred to, is in effect, the driving member of a clutch, while the worm 12 with its clutch teeth 12$^a$ is the driven member, and whenever the driven member is overloaded the pitch or inclination of its teeth is such as to cause it to back out of engagement with the driving clutch member. In Figs. 9 and 10 I have shown a modified form of this automatic throw-out mechanism in which the motor driving shaft 13$^c$ has feathered thereon a gear 12$^c$ in mesh with a gear 11$^c$ loose on its shaft 7$^c$. Gear 11$^c$ has its hub formed as the driving clutch member and coöperates with a driven clutch member $c$ feathered on the shaft 7$^c$. A lever C, pivotally mounted at its upper end to the bracket frame, engages the sliding clutch member $c$ and also engages the hub of the driving pinion 12$^c$. The teeth of the pinions 11$^c$ and 12$^c$ are inclined or arranged at an angle and whenever the gear 11$^c$ is overloaded the pinion 12$^c$ depresses the spring 17$^c$ and while continuing to drive the gear 11$^c$, as shown in Fig. 10, will slide the clutch member $c$ out of engagement with said gear 11$^c$ and in this manner power will not be imparted to the shaft 7$^c$. The clutch mechanism for connecting the power shaft 7$^c$ to the calculating machine may be the same as that illustrated in Fig. 4 and therefore need not be described here in detail.

Figure 11:
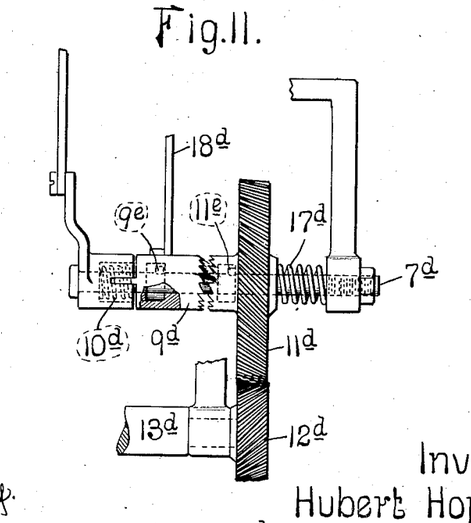
Figure 12:
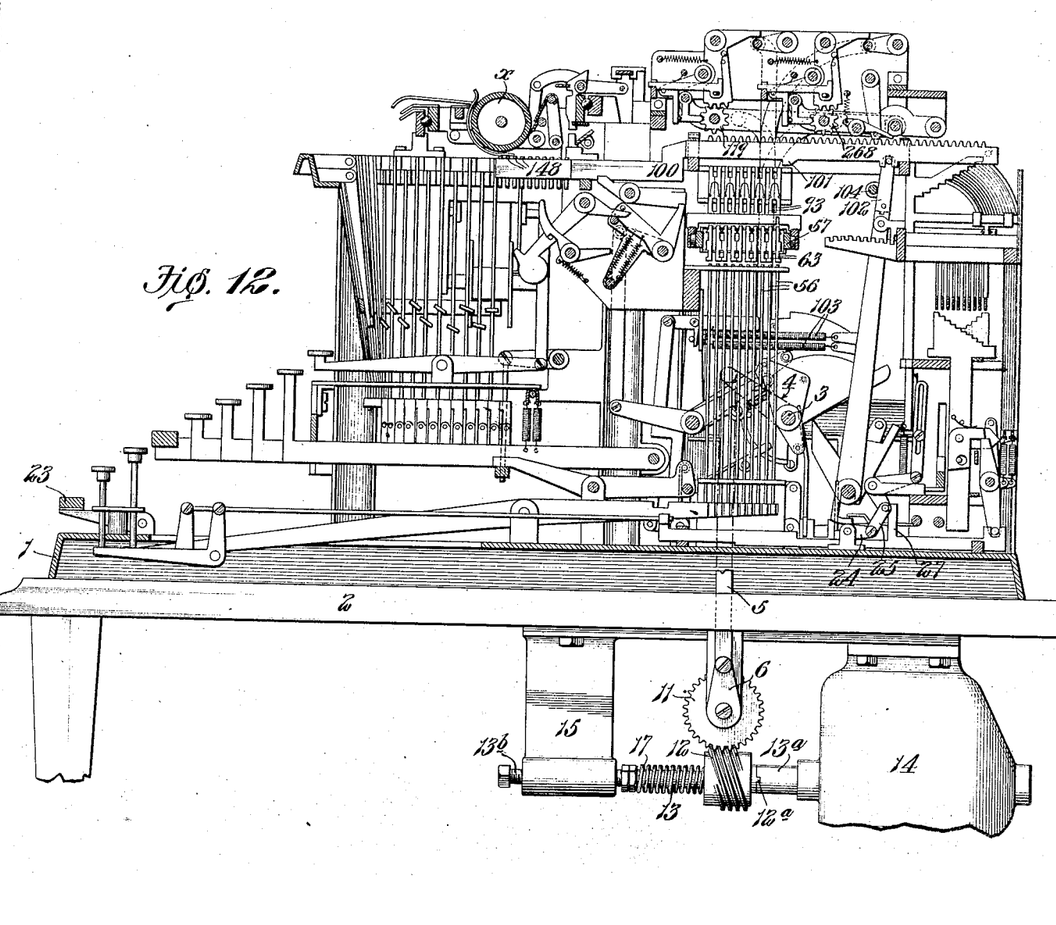
Fig. 12 is a sectional view through a calculating machine provided with my improved motor drive.
Figure 13:
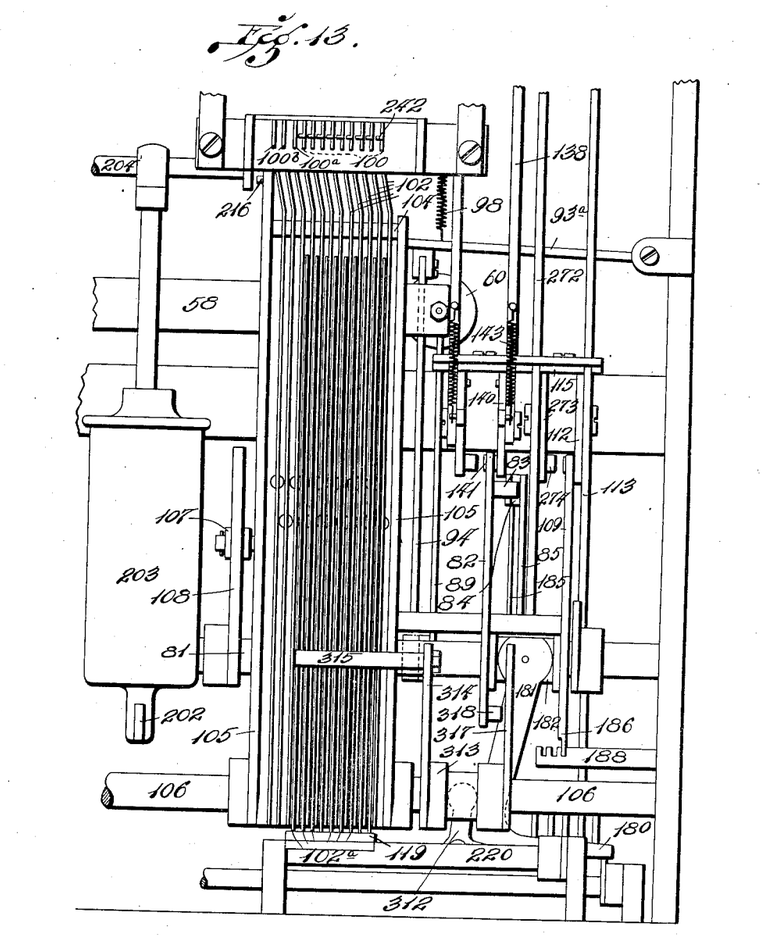
Fig. 13 is a view illustrating the means controlled by the keys for selectively engaging either group of totalizers with the actuating devices.

In Fig. 11 the driving shaft 13$^d$ drives a pinion 12$^d$, which pinion bears a fixed relation to said shaft and meshes with a gear 11$^d$. In this instance, the gear 11$^d$ is loosely mounted on a fixed shaft 7$^d$ and is permitted a longitudinal movement on said shaft by means of a pin 11$^e$ operating in a groove in the hub of said gear.

9$^d$ is a clutch member corresponding to the clutch member 9 heretofore described except that it is provided with a groove in which operates a pin 9$^e$ permitting said clutch member 9$^d$ to have a limited longitudinal movement on the fixed shaft. When the rod 18$^d$ is raised out of reach of the cam-faced projection on the clutch section 9$^d$ the spring 10$^d$ will force said clutch section into engagement with the driving clutch member on the hub of the gear 11$^d$. In the event that the clutch member 9$^e$ is overloaded the angular arrangement of the teeth on gears 11$^d$ and 12$^d$ will cause the gear 11$^d$ to move longitudinally the shaft 7$^d$ compressing the spring 17$^d$. The pin 9$^e$ will prevent the clutch member 9$^d$ from following the gear 11$^d$ and consequently, the clutch connection between said gear and said clutch member will be broken. The means for sliding the sleeve clutch member 9 on the counter shaft 7 is best illustrated in Figs. 4, 5 and 6, where it will be seen that sleeve 9 is provided with a projection 9$^a$ having a cam surface on its front edge.

Figures 4, 5, 6, 7:
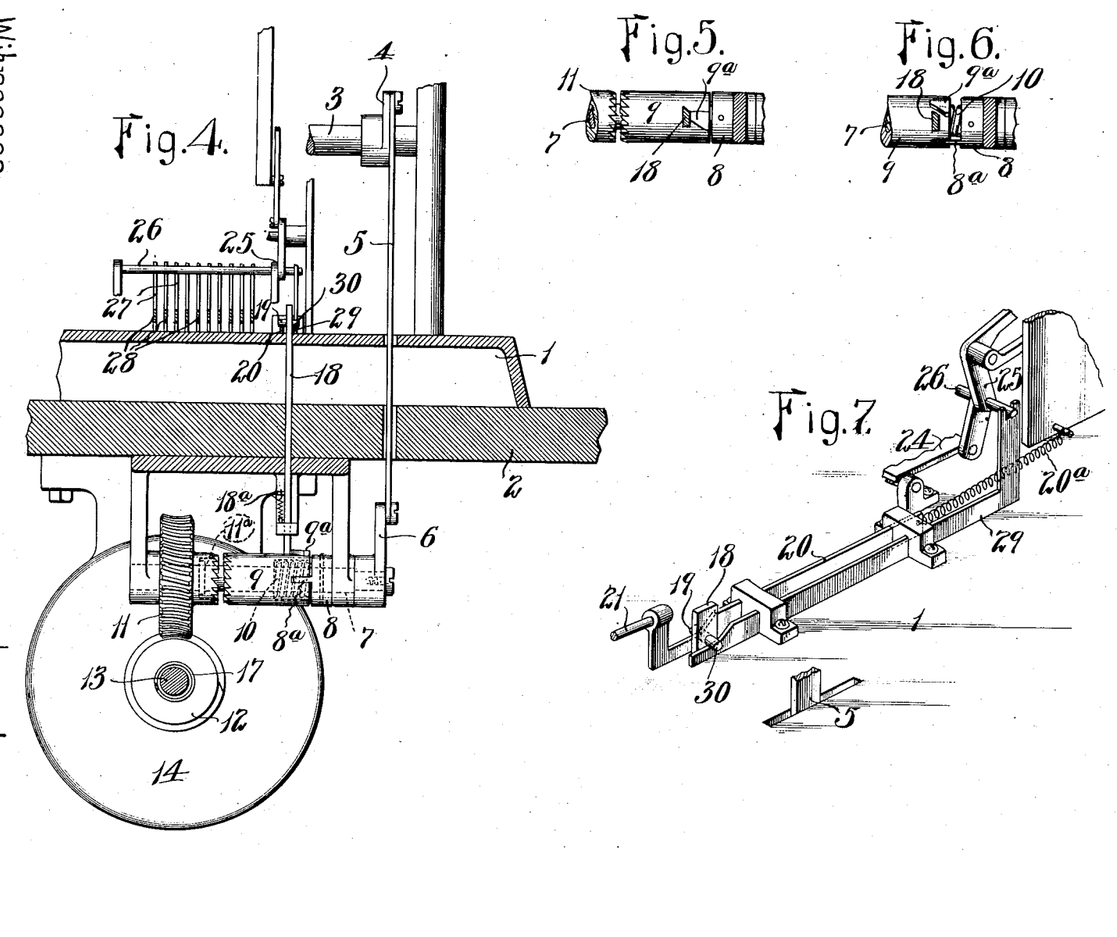
Fig. 4 is a vertical sectional view taken on the line 4—4 of Fig. 3.
Figs. 5 and 6 are detail views showing the sliding clutch member in different positions.
Fig. 7 is a perspective view illustrating a portion of the mechanism for operating the sliding clutch member.
Figure 8:
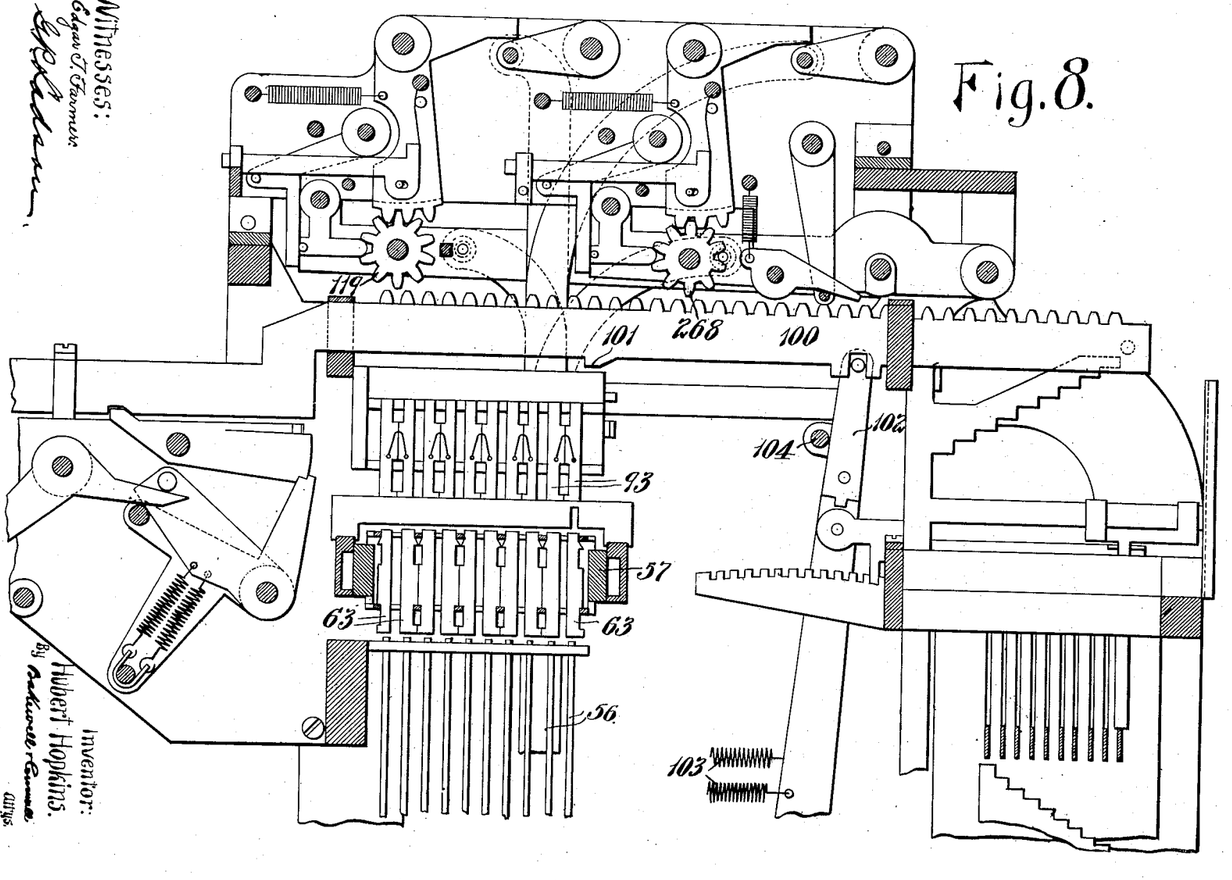
Fig. 8 is a longitudinal sectional view showing the totalizers of the calculating machine and their associate parts.

18 indicates a bar sliding vertically in suitable bearings and preferably provided with a beveled side edge for coöperating with the projection 9$^a$, as best seen in Fig. 6. A spring 18$^a$ tends to hold this bar normally in its lowered position, and when in such position it is obvious that if the sleeve 9$^a$ is being rotated the position of the parts will be as shown in Fig. 6; and when, in the rotation of the sleeve, the cam projection 9$^a$ engages with the lower end of bar 18 the sleeve 9 will be moved longitudinally the counter shaft 7, as shown in Fig. 5, in which event the teeth of sleeve 9 will be disengaged from the teeth of the driving clutch member 11. Thus the driven clutch member 9 will be brought to a position of rest while permitting the driving clutch member to continue rotating.

The means for operating the bar 18 is best illustrated in Figs. 3 and 7, wherein it will be seen that the upper end of bar 18 is provided with a lateral projection 19 which coöperates with the cam face on a horizontally sliding bar 20 mounted in suitable guides on the base plate of the calculating machine. This bar 20 is connected by a rod 21 to a key lever 22 preferably in the form of a space key. Key 23, as shown in Fig. 2, extends across the front of the key board in position to be conveniently operated by the operator. When key 23 is depressed the bar 20 is moved forward so that its cam face will raise the bar 18, releasing the clutch member 9, whereupon the spring 10 forces said clutch member into engagement with the driving clutch member. Of course, if the key 23 is held depressed, the motor will remain in engagement with the calculating machine to drive the same, but in operation it is intended that the key 23 shall be released, in which event the key will be raised by a spring 20ª and the bar 18 will be depressed so as to be in the path of the cam projection 9ª to slide the sleeve 9 longitudinally the counter shaft.

It is intended that the operation of key 23 shall cause the motor to drive the calculating machine one complete operation, and this key 23 is independent of the result keys marked R, D, E, P and T in Fig. 2, the adding keys in group A, and the multiplying keys in group B. To cause the motor to drive the calculating machine two complete operations for the purpose of obtaining tens and units partial products in the operation of multiplying, means are provided which are operable upon the depression of any of the multiplying keys in group B to effect such a result. These means are best illustrated in Figs. 7 and 3, wherein it will be seen that there is a rocking plate 24 which, in the operation of multiplying, is depressed whenever a multiplier key is operated. This plate 24 is normally held in raised position by toggle links 25, the central pintle 26 of which toggle links is in the form of a bar extending in front of projections 27 rising from the slide bars 28 connected to and operated by the multiplier keys respectively. Whenever a multiplier key is operated, one of the bars 28 is moved forward, and the projection 27 engaging the bar 26 is in engagement with bar 26 and moves said bar forward, straightening the toggle links and depressing the plates 24. The forward movement of bar 26 also causes a bar 29 with which it is in engagement to move forward. This bar 29, see Fig. 7, is like the bar 20 in that it is provided with a cam face for coöperating with a pin 30 on the upper end of the bar 18. Thus whenever one of the multiplier keys is depressed the bar 29 is moved forward, the bar 18 is raised, and the driven member of the clutch engaged with the driving member.

In the operation of multiplying, means are provided whereby the first cycle of movements imparted to the machine results in obtaining tens partial product, at the completion of which the toggle links 25 still remain in such position that the plate 24 is held depressed in order that the units partial product may be obtained. This means that the bar 26 also remains forward and consequently at the end of the first operation of the calculating machine, or when the tens partial product is obtained, the bar 29 continues to hold the bar 18 elevated and consequently the motor will remain in engagement with the calculating machine and drive the same on the second cycle or operation. Before the completion of the second operation in obtaining the units partial product the toggle 25 is broken so as to permit the plate 24 to rise, which also causes the bar 26 to move backwardly and carry with it the bar 29. This permits the bar 18 to be lowered in the path of the cam projection 9ª so that at the end of the second operation the motor will be disconnected from the calculating machine.

From the above it will be observed that the result keys and the keys in group A can be repeatedly operated without effecting the motor drive; that normal operation of the key 23 will connect the motor with the calculating machine, and cause said calculating machine to be driven by the motor one complete operation; and that whenever one of the keys in group B, the multiplier keys, is depressed, the motor will be connected to the calculating machine and drive the same two complete operations, the motor being automatically disconnected from the calculating machine at the end of the second cycle or driving operation.

Having thus described the invention, what is claimed as new and desired to be secured by Letters Patent is:

1. In a calculating machine, the combination with a key board composed of result keys, adding keys and multiplier keys, a motor, a driving shaft, a key for connecting said motor with the driving shaft of said calculating machine to effect a single operation, and means common to all of the multiplier keys for connecting the motor with said driving shaft and effecting two operations; substantially as described.

2. In a calculating machine, the combination with a key board composed of result keys, adding keys and multiplier keys, of stops which are positioned by said adding keys, a traveling carriage in which said stops are arranged, registering and recording devices, a driving shaft for operating said registering and recording devices after said stops are positioned, a motor, a key for connecting said motor to operate said driving shaft, and means common to all of the multiplier keys for connecting the motor with said driving shaft; substantially as described.

3. In a calculating machine, the combination with a key board containing a motor key and digit keys, a driving shaft for said calculating machine, a motor, means operated by said motor key for connecting the motor with said driving shaft to effect one operation thereof, and means operated by said digit keys for connecting the motor with said driving shaft and effecting two operations thereof; substantially as described.

4. The combination of a calculating machine having calculating mechanism and nine numeral multiplier keys, multiplying mechanism, a motor, and means whereby upon the depression of any one of said nine numeral multiplier keys said motor will effectively drive said calculating mechanism two complete operations to effect multiplication; substantially as described.

5. The combination of a calculating machine containing multiplying devices and a motor, a key-board composed of result keys and adding keys, the driving shaft of said calculating machine being capable of operation independently of said result and adding keys, an independently operable key for connecting said motor with the driving shaft of said calculating machine to effect a single operation, and multiplier keys which, when depressed, will connect said motor to effect two complete operations thereof; substantially as described.

6. In a calculating machine, the combination with actuating devices, of two independently operable groups of totalizer wheels, keys for selectively engaging either group with said actuating devices, a motor, and means for connecting said motor to drive said actuating devices when a selected group of totalizer wheels is in engagement therewith; substantially as described.

7. In a calculating machine, the combination with a single set of actuating devices, of two independently operable groups of totalizer wheels, means whereby both groups may be simultaneously engaged with and operated by said actuating devices, a motor, and means for effectively driving said actuating devices from said motor when said groups of totalizer wheels are in engagement with said actuating devices; substantially as described.

8. In a calculating machine, the combination with actuating devices, of two independently operable groups of totalizer wheels in operative relation thereto, and means for engaging both groups of totalizer wheels with said actuating devices, whereby a number registered in one group of totalizer wheels will be transferred to and registered in the other group of totalizer wheels, the group of totalizer wheels in which said number was originally registered standing clear at the end of the transferring operation, a motor, and means for effectively driving said actuating devices from said motor when said totalizer wheels are engaged with said actuating devices; substantially as described.

9. In a calculating machine, the combination with two groups of totalizer wheels, of a constantly running power motor under control of the operator for effecting the transfer of a number registered in either group to the other; substantially as described.

10. In a calculating machine, the combination with two groups of totalizer wheels, of means for separately introducing the items consecutively or alternately into either of said groups of totalizer wheels, a motor, and means under control of the operator for causing said motor to drive the selected group of totalizer wheels and correlated parts; substantially as described.

11. In a calculating machine, the combination with two groups of totalizer wheels, actuating devices, printing type which are positioned by said actuating devices, type hammers coöperating with said positioned printing type, a motor, means under control of the operator for causing said motor to drive said actuating devices and operate the type hammers after the printing type are positioned; substantially as described.

12. In a calculating machine, the combination with actuating devices, of two independently operable groups of totalizer wheels, printing type which are positioned by said actuating devices, means for causing said type to make a printing impression whereby a record is made of the number registered in either of said groups of totalizer wheels, a motor, and means for operating said type-impression devices and said selected totalizer wheels from said motor; substantially as described.

13. In a calculating machine, the combination with a traveling carriage containing setting-up devices, keys for positioning said setting-up devices, means controlled by the keys for causing said carriage to travel step-by-step from lower to higher orders, stop pins which are positioned by said setting-up devices, a motor, and means operated by said motor whereby said traveling carriage and its setting-up devices are operated to position said stop pins; substantially as described.

14. In a calculating machine, the combination with keys, of setting-up devices arranged in denominational series, means for successively placing each series under control of said keys, stop pins, a motor, and means for connecting said motor with said carriage for collectively positioning said stop pins from said setting-up devices; substantially as described.

15. In a calculating machine, two groups of digit keys, multiplying devices, means whereby the multiplicand may be set up in said multiplying devices by the operation of keys in one of said groups, means whereby the multiplier may be rendered effective in said multiplying devices by the operation of keys in the other of said groups, a power shaft for effecting said multiplying operations, a motor, a clutch mechanism interposed between said motor and said power shaft, and means common to all of said multiplier keys for operating said clutch when any of said multiplier keys is depressed; substantially as described.

16. In a calculating machine, the combination with a totalizer in which a number of items may be introduced and totalized, multiplying devices, means for introducing the total of said items into said multiplying devices to be multiplied, a constantly running motor, and means for connecting said motor to drive said multiplying devices to effect the operations of multiplying; substantially as described.

17. In a calculating machine, means for obtaining partial products, a register for adding said partial products together, printing means for making a record of the complete product, a second register in which said product is registered at the time it is recorded, a constantly running motor, a clutch for connecting said motor and the driving shaft of said calculating machine, means whereby said motor drives the driving shaft of said calculating machine the required number of strokes to effect the operations of multiplication, and means for preventing a record being made of the partial products produced during the multiplying operations; substantially as described.

18. In a calculating machine, two groups of digital keys, multiplying devices, means whereby the multiplicand may be set up in said multiplying devices by the operation of keys in one of said groups, means whereby the multiplier may be rendered effective in said multiplying devices by the operation of keys in the other group, a power shaft for effecting multiplying operations, printing means for making a record of the complete product, a constantly running motor, a clutch whereby said motor may be connected to said power shaft to drive the same the requisite number of times, and means operated by the multiplier keys for moving said clutch to an active position, and means operated by said multiplying devices for moving said clutch in an inactive position; substantially as described.

19. In a calculating machine, movable racks, stops adjustable to limit movement of the racks, multiplying mechanism, means for articulating the multiplying mechanism with the racks to introduce a number into the multiplying mechanism, a constantly running motor, and means for connecting said motor to drive said articulating mechanism; substantially as described.

20. The combination with mechanism operable to print any desired words, type carriers and mechanism for operating them to print numbers, a laterally movable carriage, stops in said carriage, means for adjusting said stops, a constantly running motor, and means under the control of the operator for connecting said motor and said number-printing mechanism, to print numbers from said type after said type carriers are positioned; substantially as described.

21. The combination with word-printing mechanism employing a platen, of mecha- nism separate from the word-printing mechanism and operable to print numbers on said platen, means for accumulating separate totals of the numbers as recorded and recording said totals on said platen, a motor, and means for connecting said motor to said number-printing mechanism; substantially as described.

22. The combination with manually operable word-printing mechanism employing a platen, of mechanically operated number-printing mechanism, means for separately registering a plurality of totals of the numbers printed by said mechanically operated mechanism, and means for mechanically separately printing a total of the numbers so registered; substantially as described.

23. The combination with word-printing mechanism employing a platen, manually operable line-spacing devices coöperating with said platen, mechanically operated number-printing mechanism, means for registering separate numbers and obtaining separate totals thereof, and means for mechanically effecting the line-spacing of said platen when said number-printing mechanism is in operation; substantially as described.

24. The combination with a typewriting machine and its laterally movable platen, of manually operable paper-feeding devices coöperating with said platen, a calculating machine including printing type adapted to make printing impressions on the paper supported by said platen, a motor for driving the driving shaft of said calculating machine, and means whereby said motor will also operate the paper-feeding mechanism; substantially as described.

25. The combination of a totalizer, racks, type positioned by said racks, some of which type are always in printing position, independently operable type hammers for said type, a platen for supporting the paper, a motor for positioning said type and operating said type hammers when positioned, and separate manually operable mechanism for printing words adjacent to and in line with said first-mentioned printing type; substantially as described.

26. The combination with a totalizer, actuating devices therefor, printing type which are positioned by said actuating devices to print items registered in said totalizer and the totals of said items, independently operable type hammers for said type, key-controlled stops for positioning said actuating devices, a motor, means for connecting said motor with said actuating devices, whose position is determined by said key-controlled stops, said motor operating said type hammers after the actuating devices and the said printing type are positioned, and separate manually operable mechanism for printing words adjacent to and in line with said first-mentioned type; substantially as described.

27. The combination with multiplying mechanism and recording mechanism, of a motor for operating said mechanism, and means for preventing operation of the recording mechanism during certain operations of the multiplying mechanism; substantially as described.

28. The combination with a multiplying mechanism, totalizing mechanism and recording mechanism, means for articulating said mechanism, a power shaft for operating said articulated mechanism, and means for connecting said motor to drive said power shaft; substantially as described.

29. In a motor drive for calculating machines, the combination with a clutch, clutch-operating means, multiplying mechanism and multiplier keys for actuating said clutch-operating means; substantially as described.

30. In a motor drive for calculating machines, the combination with a clutch, clutch-operating means, a key for actuating said clutch-operating means, multiplying mechanism and a series of multiplier keys, each key in said series also being connected to actuate said clutch-operating means; substantially as described.

31. In a motor drive for calculating machines, the combination with a clutch, clutch-operating means, a series of digit keys, and a connection between each key in said series and said clutch-operating means for actuating the latter upon the operation of any of said keys; and multiplying mechanism under control of said digit keys, substantially as described.

32. In a motor drive for calculating machines, the combination with a clutch, clutch-operating mechanism, multiplying devices, multiplier keys each connected to position certain of said multiplying devices, and a connection between said clutch-operating means and all of said multiplier keys, whereby when any multiplier key is operated to position its related multiplying device said clutch-operating means will be actuated; substantially as described.

33. In a motor drive for calculating machines, the combination with multiplying devices, multiplier keys for positioning said devices, clutch-operating means, and means whereby each of said multiplier keys will actuate said clutch-operating devices simultaneously with the positioning of multiplying parts connected to said key; substantially as described.

34. In a motor drive for calculating machines, the combination with adding wheels, actuating devices for said adding wheels, driving mechanism for said actuating devices, a clutch interposed between said driving mechanism and said actuating devices, and a clutch-operating mechanism including a movable bar, cam-faced plates for moving said bar, and independently operable means for operating said cam-faced plates; substantially as described.

35. In a motor drive for calculating machines, the combination with adding wheels, actuating devices for said adding wheels, driving mechanism for said actuating devices, a clutch interposed between said driving mechanism and said actuating devices, said clutch comprising driving and driven clutch members, the latter having a cam-faced projection, a bar for engaging said cam-faced projection and moving said driven clutch member out of engagement with the driving member, means for actuating said bar, and yielding means for forcing the driven member into engagement with the driving member when said bar is moved; substantially as described.

36. In a motor drive for calculating machines, the combination with adding wheels, actuating devices for said adding wheels, driving mechanism for said actuating devices, said driving mechanism comprising a motor, a driven gear, a driving gear, a driving shaft on which said driving gear is mounted, a spring arranged on said driving shaft and exerting its energy to constantly maintain said gear and shaft in driving relation, and means for disconnecting said driving gear from its shaft when the driven gear is overloaded, said means forcing said driving gear longitudinally the driving shaft against the energy of said spring; substantially as described.

37. In a motor drive for calculating machines, the combination with adding wheels, actuating devices for said adding wheels, driving mechanism for said actuating devices, said driving mechanism comprising a motor, a driven gear, a driving gear, a driving shaft on which said driving gear is loosely mounted, interlocking projections with recesses for effectively connecting the driving gear to its shaft, a spring for maintaining such connection, and means for moving said driving gear along said shaft against said spring to disconnect it from the shaft when the driven gear is overloaded; substantially as described.

38. In a motor drive for calculating machines, the combination with adding wheels, actuating devices for said adding wheels, driving mechanism for said actuating devices, said driving mechanism comprising a motor, a driven worm wheel gear, a driving worm, a shaft on which said worm is loosely mounted, and yielding means for holding said worm in driving connection with said shaft during such time that the driven worm is not overloaded; substantially as described.

39. In a motor drive for calculating machines, the combination with adding wheels, actuating devices for said adding wheels, driving mechanism for said actuating devices, said driving mechanism comprising a motor, an armature shaft, of a worm loosely mounted thereon, and having a side-faced toothed connection with said shaft, yielding means for holding said worm in driving connection with said shaft, and a worm wheel driven by said worm, the pitch of the teeth of said worm being such that when the worm wheel is overloaded the worm will be disconnected from its driving shaft; substantially as described.

40. In a motor drive for calculating machines, the combination with adding wheels, actuating devices for said adding wheels, driving mechanism for said actuating devices, said driving mechanism comprising a motor, two meshing gears whose teeth have a spiral pitch, one of which gears is movable longitudinally its shaft, yielding means for holding said movable gear in normal position, and a clutch which is operated when said gear is in abnormal position; substantially as described.

41. In a motor drive for calculating machines, the combination with adding wheels, actuating devices for said adding wheels, driving mechanism for said actuating devices, said driving mechanism comprising a motor, two gears whose teeth are pitched at an angle whereby when one of said gears is overloaded one of them will be laterally displaced due to the pitch of its teeth, a spring bearing against said gear at all times and exerting its energy to restore the same to normal position, and a clutch which is open when said gear is in abnormal position; substantially as described.

In testimony whereof I hereunto affix my signature in the presence of two witnesses, this eighth day of February 1907.

HUBERT HOPKINS.

Witnesses:
F. R. CORNWALL,
GEORGE BAKEWELL.